United States Patent [19]

Kondo et al.

[11] Patent Number: 4,731,214

[45] Date of Patent: Mar. 15, 1988

[54] PROCESS FOR PREPARING A THERMALLY SHRINKABLE MULTILAYER FILM

[75] Inventors: Kazuo Kondo; Nobuya Ishiguro, both of Marugame, Japan

[73] Assignee: Okura Industrial Co., Ltd., Kagawa, Japan

[21] Appl. No.: 921,161

[22] Filed: Oct. 21, 1986

[30] Foreign Application Priority Data

May 16, 1986 [JP] Japan ................................ 61-113260

[51] Int. Cl.$^4$ .............................................. B29C 55/10
[52] U.S. Cl. ...................................... 264/514; 264/171; 264/210.5; 264/210.7; 264/289.6; 264/290.2
[58] Field of Search .................. 264/289.6, 290.2, 514, 264/171, 210.1, 210.5, 210.7

[56] References Cited

U.S. PATENT DOCUMENTS

| | | | |
|---|---|---|---|
| 4,164,529 | 8/1979 | Frijita et al. | 264/290.2 |
| 4,247,584 | 1/1981 | Widiger et al. | 264/210.7 |
| 4,501,797 | 2/1985 | Super et al. | 264/290.2 |
| 4,501,798 | 2/1985 | Koschak et al. | 264/290.2 |

FOREIGN PATENT DOCUMENTS

| | | | |
|---|---|---|---|
| 88065 | 8/1978 | Japan | 264/290.2 |
| 88067 | 8/1978 | Japan | 264/210.7 |
| 142475 | 12/1978 | Japan | 264/290.2 |
| 1111305 | 4/1968 | United Kingdom | 264/290.2 |

Primary Examiner—James Lowe
Attorney, Agent, or Firm—Armstrong, Nikaido, Marmelstein & Kubovcik

[57] ABSTRACT

The process for preparing a thermally shrinkable multilayer film composed of a polyamide resin layer as one surface layer and a sealant material layer as the other surface layer includes the step of causing the polyamide resin layer of the oriented laminate film to absorb water in the amount of 7.0% by weight or more before or during the thermal treatment. The laminate film is then dried so as to cause the polyamide resin layer to make the water content in the range form 2.5% by weight to 6.5% by weight while maintaining the oriented laminate film at temperatures of 90° C. or lower after or during the thermal treatment. The thermally shrinkable multilayer film thus prepared is suitable for thermally shrinking packing foods such as roast meat or fresh cut meat.

10 Claims, 1 Drawing Figure

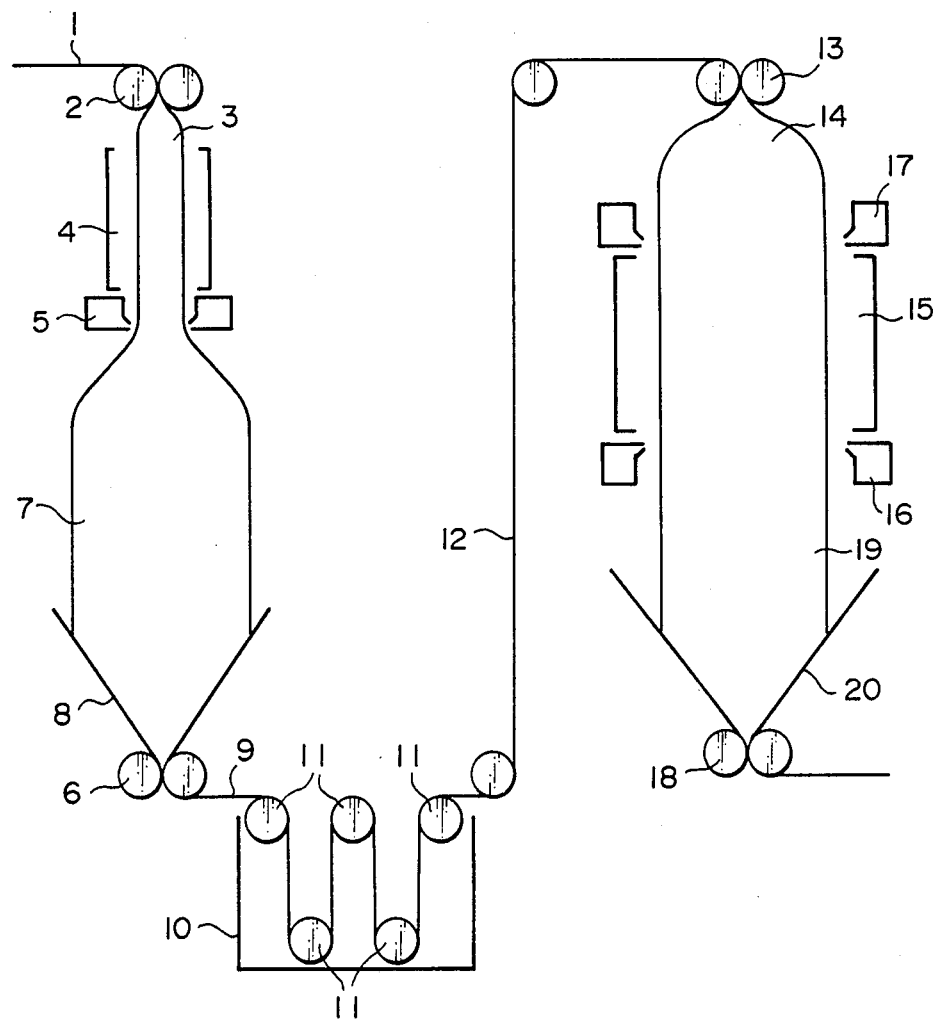

PROCESS FOR PREPARING A THERMALLY SHRINKABLE MULTILAYER FILM

BACKGROUND OF THE INVENTION

1. Field of the Invention

The present invention relates to a process for preparing a thermally shrinkable multilayer film and, more particularly, to a process for preparing a thermally shrinkable multilayer film suitable, in particular, for packing processed meat such as roast pork or cuts of fresh meat.

2. Description of the Prior Art

Processed meat such as roast pork and so on had heretofore been processed and sold by individual meat shops; however, processed meat is now being produced and distributed by large meat processors and food manufacturers to individual meat shops because storage methods for a thermally shrinking package with oxygen barrier properties have been developed and have made it possible to store such processed meat for a long period of time. And fresh beef meat and so on had heretofore been transported without cutting from butcheries directly to individual meat shops. Recently, however, fresh meat is cut into pieces at butcheries and transported to individual meat shops as cut meat while being refrigerated at temperatures around 0° C. after being packed in a thermally shrinked manner.

As films for thermally shrinkable packaged processed meat and cut meat there have heretofore been preferably employed thermally shrinkable multilayer films containing a polyamide resin layer from the viewpoint of mechanical strength. In order to store packed contents for a longer period of time, there has preferably been employed a thermally shrinkable multilayer film with an oxygen barrier resin layer composed of a saponified ethylene-vinyl acetate copolymer (heretofore referred to as "EVOH") as a middle layer. The thermally shrinkable multilayer films have been prepared by laminating a sealant material such as a polyethylene resin film or an ethylene-vinyl acetate copolymer resin film or an EVOH film to a thermally shrinkable polyamide resin film by means of a dry laminating method. From the viewpoint of productivity and thermal shrinkability, it is preferred to use a coextrusion laminating orientation method for producing the thermally shrinkable multilayer film; however, such thermally shrinkable multilayer films which are produced by a coextrusion laminating orientation method, have the disadvantage that they may cause curling or be transformed because they have a natural shrinkability or the film flatness may be impaired. Accordingly, they had to be produced without causing curls and a natural shrinkability as well as be set so as to cause little decrease in a thermal shrinkability. Heretofore, there has been employed a process that sets such thermally shrinkable multilayer film by heating so as to lead to a thermal shrinkage while providing the resulting film with a relaxation.

The thermally shrinkable multilayer film with a polyamide resin layer as an outermost layer on one of the surface sides has generally caused a large degree of curling. Accordingly, such a polyamide layer has often been employed, for example, as a middle layer while the both outermost layers have been composed of an identical resin.

In conventional processes for producing thermally shrinkable multilayer films where there are employed the conventional setting procedures that involve heating coextrusion laminated, oriented films or shrinking thermally while giving a relaxation, if the setting were carried out so as not to cause any curling or natural shrinkability, thermally shrinkable characteristics are impaired to a large extent. If the setting were carried out so as to maintain a thermal shrinkability inherent in thermally shrinkable multilayer films, curling and natural shrinkability generally result. In particular, the thermally shrinkable multilayer film with a polyamide resin layer laminated on one of the surfaces as an outermost layer is composed of a polyamide resin capable of being set at temperatures different to a considerable extent from temperatures at which a resin to be employed for a sealant material or the like is set so that the tendency as described hereinabove is rendered all the more remarkable. More specifically, in instances where the thermally shrinkable multilayer film is set at high temperatures at which no natural shrinkability of the polyamide resin layer is caused to occur and/or at high rates of relaxation, on the one hand, the sealant material layer is caused to lose its thermal shrinkability. In instances where the thermally shrinkable multilayer film is set at low temperatures at which the sealant material layer and so on can maintain its thermal shrinkability and/or at low rates of relaxation, on the other hand, an amount of natural shrinkability of the polyamide resin layer is caused to be increased to a large extent. As a result, the resultant thermally shrinkable multilayer film has a high extent of natural shrinkability, thereby leading to the impairment of flatness of the film or causing curls.

SUMMARY OF THE INVENTION

Therefore, the present invention is a process for setting a thermally shrinkable multilayer film with a polyamide resin layer on one of the surface sides thereof and a sealant material layer on the other thereof in such a manner that the thermal shrinkability of a coextrusion laminated, oriented film is not lessened to a large extent, a natural shrinkability is caused to be lost, and no or few curls are caused to occur.

As a process for preparing a thermally shrinkable multilayer film having a polyamide resin layer as a surface layer so as to provide a good thermal shrinkability and a less natural shrinkability as well as to cause no or few curls, it may be proposed that two set techniques are combined, one set technique being to provide the polyamide resin layer with the effect created by the setting and decrease an amount of natural shrinkability to a great extent while producing no or few effects on the sealant material layer by the setting, and the other set technique being to provide the sealant material layer with the effect created by the setting while giving to the thermally shrinkable multilayer film no or little effect to be produced by the setting.

From the background as described hereinabove, it has now been found that a setting step involving the thermal treatment to be conducted after water has been absorbed in the polyamide resin layer or while water is being absorbed therein can provide the polyamide resin layer with the setting effect while producing no or little effect conventionally created by the setting on the sealant material layer.

The process according to the present invention may be summarized in that a coextrusion laminated, oriented film is thermally treated while maintaining temperatures in the range from 50° C. to 90° C., after water has been absorbed, or while it is being absorbed, in the polyamide resin layer provided on one of the surfaces of the coextrusion laminated, oriented film so as to make the water content in the polyamide resin layer 7.0 percent by weight or higher while maintaining the oriented laminate film at temperatures as high as or lower than 90° C., and then the oriented laminate film is dried while maintaining the temperature of the film at 90° C. or lower so as to make the water content of the polyamide resin layer in the range from 2.5 percent by weight to 6.5 percent by weight after or during the thermal treatment.

BRIEF DESCRIPTION OF THE DRAWING

The FIGURE is a flow chart illustrating a process for preparing a thermally shrinkable multilayer film in accordance with the present invention.

DETAILED DESCRIPTION OF THE PREFERRED EMBODIMENTS

The present invention will be described more in detail during the course of the following description.

The process for preparing a thermally shrinkable multilayer film in accordance with the present invention is concerned with a thermally shrinkable multilayer film with a polyamide resin layer on one of the surfaces thereof and a sealant material layer on the other of the surfaces thereof and, more preferably, such a thermally shrinkable multilayer film containing an EVOH layer as an oxygen barrier resin layer or an adhesive resin layer for improving the adhesive strength between the layers.

An oriented laminate film produced merely by biaxially orienting a coextrusion laminated, unoriented raw film having the above composition has a high thermal shrinkability at higher temperatures and a large natural shrinkability at ambient temperatures while causing a large amount of curls. The polyamide resin layer of the oriented laminate film, on the one hand, has a large natural shrinkability at ambient temperatures although it has a thermal shrinkability at higher temperatures. Furthermore, this natural shrinkability is such that it could not be caused to be lost or lessened in conventional thermal treatment/relaxation setting processes unless high temperatures and/or high relaxation rates are applied causing the thermally shrinkable properties of the sealant material layer to be lost. The sealant material layer thereof, on the other, has such a natural shrinkability at ambient temperatures which is lost by conventional setting processes although it shows a large thermal shrinkability at higher temperatures. This thermal shrinkability is such that it could not be lessened to a large extent by conventional setting processes.

In the production of the thermally shrinkable multilayer film with a polyamide resin layer as one surface layer and a sealant material layer as the other surface layer, it is necessary to employ a process for setting the polyamide resin layer in such a manner as to lose a natural shrinkability at ambient temperatures even if the thermal shrinkability at higher temperatures would be impaired to some extent. On top of that, it is preferable that the thermal shrinkability of the sealant material layer is not lessened.

As such a setting process, a new technique has now been found in which the setting is carried out by thermally treating the coextrusion laminated, oriented film after having caused or while causing the polyamide resin layer to absorb a certain amount of water. This setting process enables the natural shrinkability at ambient temperatures to be lost although an amount of the thermal shrinkability at higher temperatures for the polyamide resin layer is lessened to some extent. Furthermore, this process does not adversely affect the thermal shrinkability upon the sealant material layer to a great extent in instances where the absorption of water in the polyamide resin layer and the thermal treatment thereof are conducted at temperatures lower than a certain temperature or the drying is carried out at such temperatures as long as no large relaxation is given. Also, in order to remove the natural shrinkability at ambient temperatures of the sealant material layer while impairing the thermal shrinkability at higher temperatures to a lesser extent, the conventional setting technique that involves the thermal treatment and relaxation to thermally shrink the oriented laminate film may be combined with the new technique as described hereinabove, at the time of water absorption in, or the thermal treatment of, the polyamide resin layer, or its drying. Under conditions under the sealant material layer is set, the thermally shrinkable characteristics of the polyamide resin layer is little affected so that the thermal shrinkability can be maintained at a high level.

It is further noted that, in instances where an adhesive resin layer is employed as a middle layer, the adhesive resin layer, on the one hand, behaves in substantially the same manner as the sealant material layer does during the setting step so that the adhesive resin layer may be set at the same time as the sealant material layer is set. The EVOH layer interposed as a middle layer adjacent to the polyamide resin layer as a surface layer, on the other hand, indicates substantially the same behavior in terms of the setting as the polyamide resin layer does. Accordingly, the EVOH layer may be set, after being subjected to absorption of water and then thermal treatment, at the time when the polyamide resin layer is set. It is, however, to be noted that, in instances where the EVOH layer to be employed as a middle layer is laminated on both surfaces with a hydrophobic resin layer, an amount of natural shrinkability and the occurrence of curls can be lessened by rendering the thickness of the EVOH layer thinner. Even if the film thickness of the EVOH layer is rendered thin, it has a remarkably good oxygen barrier characteristic so that the properties of the thermally shrinkable multilayer film for packing processed meat and cut meat are not impaired.

The thermally shrinkable multilayer film in accordance with the present invention, which is provided with the polyamide resin layer as one surface layer and with the sealant material layer as the other surface layer, may be prepared by the following steps and under the following conditions.

Using a plurality of extruders, a coextrusion laminated, unoriented raw film may be prepared from a laminate die so as to comprise a polyamide resin layer laminated as one surface layer and a sealant material layer laminated as the other surface layer with each of the layers melt united integrally. In order to facilitate orientability for the convenience of application to subsequent treatments, it is preferred that the resulting coextrusion laminated, unoriented raw film is cooled with water or the like immediately thereafter. In instances where the orienting method of the tenter type is applied, it is preferable to yield an unoriented laminate raw film in the sheet form using a T-die. In instances where the orienting method of the inflation type is applied, it is preferable to yield an unoriented laminate raw film in the tube form using a multilayer circular tubing die. More preferably, such an unoriented laminate raw film as in the tube form is constructed such that the polyamide resin layer is provided as the outermost layer and the sealant material layer is provided as the innermost layer. This construction is convenient when it is set at subsequent steps.

In providing the EVOH layer as the middle layer, it is preferable to allow the EVOH raw material to have a water content meeting the following general formula:

$$0.004(100 - x) + 0.10 \geq Mc \geq 0.022 \sqrt{(100 - x)}$$

where
 Mc is a water content in percent by weight, and
 x is an ethylene content in percent by mole ($26 \leq x \leq 55$).

In the above formula, the water content of the EVOH raw material is calculated from a decrease in weight measured by drying upon the thermal treatment of raw material pellets at 140° C. for 4 hours in vacuo as low as 0.05 mmHg.

It is to be noted that, in instances where the water content in the EVOH raw material is in the range satisfying the above formula, a favorable orientability is provided without causing a rupture during the orienting because bubbles are formed in the EVOH layer, and a load imposed on an extruder for extruding the EVOH layer is not caused to be increased.

The unoriented laminate raw film formed by coextrusion may be oriented in the manner of the tenter type or of the inflation type by approximately two to four times each in the longitudinal or machine direction and the transverse direction. In the orienting step, a simultaneous biaxially orienting technique of the inflation type is preferred in terms of thermal shrinkability properties, in particular, an extent of thermal shrinkability, and from the view-point of a balance between thermal shrinkages in the longitudinal direction and in the transverse direction.

The resulting oriented laminate film is then treated so as to cause the polyamide resin layer thereof to absorb water in an amount of 7.0 percent by weight or higher while maintaining the temperature of the oriented laminate film at 90° C. or lower. In methods of causing the polyamide resin layer to absorb water there may be included a method involving an immersion of the oriented laminate film in a warm water at 90° C. or lower or a method involving the spraying of a warm water at 90° C. or lower while maintaining the temperature of the oriented laminate film at 90° C. or lower. The former is preferred in terms of efficiency and productivity. In causing water to be absorbed in the polyamide resin layer of the oriented laminate film in the tube type, produced by the inflation-type orienting method, it is necessary that the polyamide resin layer be provided on the outermost surface of the laminate film as described hereinabove.

The amount of the water to be absorbed in the polyamide resin layer may be conveniently chosen by varying the period of time for which the laminate film is immersed in a warm water or a warm water is sprayed thereon, the temperature of the warm water, or the temperature of the film. In the event that a shrinkage occurs to a great extent during the water absorption, it is to be noted that the water absorption is conducted so as not to cause a shrinkage to occur by using a clip or a roller when the laminate film is of the sheet type or by pouring a pressurized air into bubbles when the laminate film is of the tube type.

The resulting oriented laminate film with water absorbed in the polyamide resin layer is then subjected to thermal treatment while the film is maintained at temperatures ranging from 50° C. to 90° C. The thermal treatment may be carried out by blowing hot air upon the laminate film or exposing far infrared rays thereto at the time when the polyamide resin layer is caused or after it was caused to absorb water therein. If a shrinkage occurs on the laminate film to a large extent during the thermal treatment, it is necessary to cause no or little shrinkage to arise by using a clip or a roller or by pouring pressurized air thereinto. Periods of time necessary for the thermal treatment may range from 2 seconds to 120 seconds and, preferably, from 3 seconds to 60 seconds.

After the polyamide resin layer was caused to absorb water and then subjected to thermal treatment as described hereinabove, the oriented laminate film is dried at temperatures of the film failing to exceed 90° C. to such an extent that the water content of the polyamide resin layer may range from 2.5 percent by weight to 6.5 percent by weight. The drying may be conducted simultaneously with the thermal treatment to be carried out after the water absorption of the polyamide resin layer, or separately from the above thermal treatment by blowing a hot air against the film or exposing it to far infrared rays. If a shrinkage was caused to occur to a large extent when the oriented laminate film is dried at temperatures failing to exceed 90° C., it is necessary to prevent such a shrinkage from occurring by using a clip or a roller or by pouring pressurized air as in the steps of water absorption and thermal treatment.

It is noted that the water content of the polyamide resin is calculated from a decrease in weight when dried by thermal treatment at 110° C. for 3 hours.

Needless to say, the water absorption step, the thermal treatment step, and the drying step may be conducted separately from each other. However, it is desirable to conduct the water absorption step and the thermal treatment step simultaneously or the thermal treatment step and the drying step simultaneously from the view point of productivity. The latter combination is more preferred in various respects.

The thermally shrinkable multilayer film produced by the above-described steps may be employed as it is for packing processed meat or cut meat in a thermally shrunken manner. However, such thermally shrinkable multilayer film as produced by these steps cannot provide the sealant material layer with a sufficient effect to be created by the setting process. If the thermally shrinkable multilayer film is likely to have a large amount of of natural shrinkability, it is preferably set at temperatures of the film failing to exceed 90° C. by the conventional thermal treatment and relaxation. However, it is desirable in terms of productivity that the setting of the sealant material layer be carried out in combination with the water absorption step and the thermal treatment step of the polyamide resin layer or with the drying step.

The thickness of the thermally shrinkable multilayer film according to the present invention may be in the range from approximately $30\mu$ to approximately $100\mu$, and the thickness of the polyamide resin layer may be in the range from approximately $10\mu$ to approximately $30\mu$. The layer construction consists of the polyamide resin layer as one surface layer and the sealant material layer as the other surface layer. The EVOH layer may be provided in order to increase an oxygen barrier property and an adhesive resin layer may be provided to strengthen the strength of adhesion between the layers. The EVOH layer may be thick in the range from about $3\mu$ to about $10\mu$, and the adhesive resin layer may be in the range from about $3\mu$ to about $20\mu$.

As the polyamide resin there may be employed a material for use in the area of packing such as nylon-6 or nylon-66, and it is preferred to use a copolymer of nylon-6 with nylon-66 in terms of thermal shrinkability. As the sealant material there may be employed a heat sealing material to be used in the field of packaging, such as polyethylene resin, ethylene-vinyl acetate copolymer resin, polypropylene resin or ionomer resin. The adhesive resin may include, for example, a modified polyethylene resin with the polar groups graft copolymerized, a modified ethylene-vinyl acetate copolymer resin or a modified polypropylene resin. Such an adhesive resin may also be employed as a sealant material. As an EVOH may be preferably employed one having an ethylene content in the range from 26 molar percent to 55 molar percent and a saponification degree in the range as high as 98% or higher.

The following is a description of one embodiment of the process for preparing the thermally shrinkable multilayer film in accordance with the present invention by the biaxial orientation of the inflation type by reference to the drawing attached hereto.

Using a plurality of extruders (not shown) and a multilayer circular die (not shown), a multilayer raw film in the tubular form is extruded in such a manner that a polyamide resin layer is provided as the outermost layer, a sealant material layer as the innermost layer, and an EVOH layer and an adhesive resin layer as middle layers. For the extrusion, an EVOH raw material with a predetermined water content is employed. The coextrusion laminated, unoriented raw film is cooled using a conventional cooling method such as water-cooling method, mandrel method or the like (not shown) and folded in the flat state. The raw film 1 is then forwarded to feeding nip rollers 2 at a constant velocity and inflated with pressurized air. The tubular raw film 3 so inflated is then heated using a preheating oven 4 and an air ring 5 for blowing up hot air to temperatures at which it can be oriented. The tubular raw film 3 is oriented in a longitudinal direction by the circumferential speeds of the feeding nip rollers 2 and withdrawing nip rollers 6, and, at the same time, it is oriented in a transverse direction by the pressurized air blown thereinto. The biaxially oriented extension bubble 7 is flattened using flat guide rolls 8 and then withdrawn by the withdrawing nip rollers 6 for forwarding to the next steps. The tubular laminate film 9 so oriented biaxially by the usual inflation method conventionally used is immersed in a warm water tank 10 while being carried with a series of guide rolls 11 so as to allow the polyamide resin layer to absorb a predetermined content of water. The oriented laminate film 12 thus treated is then forwarded by feeding nip rollers 13 at a constant velocity to the steps for the thermal treatment and the drying of the polyamide resin layer and the setting of the sealant material layer. The oriented laminate film 12 fed into the feeding nip rollers 13 is then inflated with pressurized air into a bubble film 14 which in turn is subjected to the thermal treatment and the drying using an outer heating oven 15, an air ring 16 for blowing up hot air, and an air ring 17 for drawing hot air. In the above step, the sealant material layer or the like is heated and then set while relaxing in the transverse and longitudinal directions by the circumferential speeds of the feeding nip rollers 13 and withdrawing nip rollers 18 and by adjustment of pressurized air in the bubble. The bubble 19 in which the polyamide resin layer was thermally treated and dried and the sealant material layer or the like is set is again flattened by flat guide rolls 20 and withdrawn by withdrawing nip rollers 21. The flattened oriented laminate film is then wound by a winding machine (not shown).

The process for preparing thermally shrinkable multilayer film with the polyamide resin layer as a surface layer in accordance with the present invention is constructed by carrying out the thermal treatment and the drying after some degree of water was absorbed in the polyamide resin layer so that it is industrially simple. The thermally shrinkable multilayer film so prepared by the process according to the present invention causes no natural shrinkability at ambient temperatures and no curls without decreasing thermal shrinkability at higher temperatures to a great extent. The process according to the present invention can exhibit superior effects as a process for preparing the thermally shrinkable multilayer film with an EVOH layer or an adhesive resin layer as a middle layer. The thermally shrinkable multilayer film prepared by the process according to the present invention can be used for packing foods for general purposes as well as for thermally shrinkable packaging of processed meat and cut fresh meat.

The present invention will be described more in detail by way of working examples in comparison with comparative examples.

EXAMPLE 1

From a copolymer of nylon-6 and nylon-66 (Product of Toray Industries, Inc., "Amilan CM6041") for a polyamide resin layer as the outermost layer, a modified polyethylene resin (Product of Mitsubishi Chemical Industries, Ltd., "Novatech Ap220L") for an adhesive resin as a middle layer, and a polyethylene resin (Product of Sumitomo Chemical Co., Ltd., "Sumkasen F-208") for a sealant material as the innermost layer, an unoriented tubular laminate raw film was prepared by extrusion through a three-layer circular die connected to three extruders. The unoriented tubular laminate raw film was subjected to inflation biaxial orientation and set using the orienting device and the setting device as shown in the FIGURE. In the drawing step, the raw film was oriented simultaneously in both the longitudinal direction and the transverse direction each by 3.0 times. The biaxially oriented laminate film was immersed in warm water at 85° C. and allowed the polyamide resin layer to absorb water in 7.8% by weight. In this step, the film is caused to shrink in both the transverse direction and the longitudinal direction each by approximately 3%. The resulting oriented laminate film was thermally treated at 65° C. for 12 seconds as it was dried to make the water content 4.2% by weight. In the thermal treatment step and the drying step, there was utilized the setting method for thermally shrinking while providing each approximately 7% of relaxation in both the transverse direction and the longitudinal direction as well as losing natural shrinkability in the adhesive resin layer and the sealant material layer. The layer construction of the thermally shrinkable multilayer film thus prepared was $20\mu$, $10\mu$ and $30\mu$ in the order from the outermost layer.

COMPARATIVE EXAMPLE 1

For comparison purposes, the oriented laminate film was treated at 80° C. immediately after the orientation without causing the polyamide resin layer to absorb water, so as to provide a relaxation by 12% in both the transverse direction and the longitudinal direction.

Table 1 shows the shrinkability characteristics, flatness, and curls of the thermally shrinkable multilayer film of Example 1 and Comparative Example 1.

TABLE 1

| Measured Items | Example 1 | Comparative Example 1 |
| --- | --- | --- |
| Thermal shrinkability (%) | | |
| 80° C. (MD/TD) | 24/27 | 21/23 |
| 90° C. (MD/TD) | 31/35 | 27/30 |
| Natural shrinkability (%) | | |
| 23° C., 7 days (MD/TD) | 1.6/1.8 | 3.4/3.7 |
| 40° C., 7 days (MD/TD) | 2.8/3.0 | 5.6/5.8 |
| Film Flatness | | |
| 23° C., after 7 days | Good | Poor |
| Curls | | |
| 23° C., after 7 days | None | Present |

As is apparent from Table 1 above, the thermally shrinkable multilayer film prepared by the process in accordance with the present invention indicates a higher thermal shrinkability and a lower shrinkability than that of Comparative Example 1, and the inventive process did not decrease its film flatness and cause any curls after it was allowed to stand under natural circumstances.

The thermally shrinkable multilayer film prepared by the process in accordance with the present invention has provided a thermally shrinked package that has a good appearance, a high strength, and a favorable storage for a long period of time, when it packs cut fresh meat.

EXAMPLES 2-6 AND COMPARATIVE EXAMPLES 2-6

The oriented laminate film prepared in Example 1 was set in substantially the same manner as Example 1 using the setting device as shown in the FIGURE by varying the water content of the polyamide resin layer, temperatures and times of the thermal treatment and the drying as shown in Table 2 below. The absorption of water in the polyamide resin layer was carried out by immersion in a warm water of 23° C., and the shrinkages in the longitudinal and transverse directions were found to be at rates each of approximately 3%. It was set by thermally shrinkage with a relaxation at rates in the longitudinal and transverse directions during the thermal treatment step and the drying step were both 5% at 40° C. to 50° C., 7% at 70° C., and 10% at 85° C. or higher. The thermally shrinkable multilayer films so prepared were then measured for the thermal shrinkability, natural shrinkability, film flatness, and occurrence of curls.

It was apparent from Table 2 that it was necessary to cause the polyamide resin layer of the stretched laminate film to absorb water in the amount as high as 7.0% by weight or higher and to carry out the thermal treatment and the drying at the temperatures in the range from 50° C. to 90° C. It was also found that the water content of the polyamide resin layer after the drying was in the range from 2.5% by weight to 6.5% by weight.

TABLE 2

| | Water Content of Polyamide Resin Layer (%) | Temperature of Thermal Treatment & Drying (C.) | Period for Thermal Treatment & Drying (sec) | Water Content of Polyamide Resin Layer after Drying (%) | Remarks |
| --- | --- | --- | --- | --- | --- |
| Example | | | | | |
| 2 | 7.0 | 70 | 12 | 3.8 | Favorable |
| 3 | 7.5 | 50 | 20 | 5.4 | Favorable |
| 4 | 8.0 | 90 | 8 | 3.2 | Favorable |
| 5 | 7.5 | 85 | 30 | 2.5 | Favorable |
| 6 | 8.0 | 50 | 8 | 6.5 | Favorable |
| (Comparative Examples) | | | | | |
| 2 | 6.5 | 70 | 12 | 3.6 | Large natural shrinkability |
| 3 | 7.5 | 40 | 25 | 6.2 | Large natural shrinkability |
| 4 | 8.5 | 95 | 8 | 3.0 | Small thermal shrinkability |
| 5 | 7.5 | 90 | 45 | 2.3 | Poor film flatness with curls |
| 6 | 8.5 | 50 | 5 | 6.8 | Poor film flatness with curls |

EXAMPLE 7

The oriented laminate film prepared in Example 1 was set using the setting device as shown in the FIGURE in which a warm water was sprayed on a film in the bubble form prepared by blowing pressurized air in the tube between the nip rollers. The temperature of the oriented laminate film at which the warm water was sprayed was 90° C. In the water absorption step, the warm water was sprayed for about 5 seconds and the film was thermally shrunk with a relaxation at a rate of about 12% in both the longitudinal and transverse directions. The water content of the polyamide resin layer after the water absorption step was found to be 9.4% by weight. The drying step was conducted by heating the stretched laminate film to 60° C. without providing any relaxation in both the longitudinal and the transverse directions, and the water content of the polyamide resin layer after the drying was found to be 5.7% by weight. The thermally shrinkable multilayer film so prepared was measured for its thermal shrinkability.

As a result, the thermally shrinkable multilayer film produced herein was found to have the thermal shrinkability characteristics necessary for thermally shrunken packaging.

COMPARATIVE EXAMPLE 7

The procedures of Example 7 were followed with the exceptions as described hereinbelow. The temperature of the oriented laminate film to which the hot water was sprayed was set at 95° C. The water content of the polyamide resin layer was 9.6% by weight after the water absorption step and 5.8% by weight after the drying step.

The thermally shrinkable multilayer film produced in Comparative Example 7 lost its thermal shrinkability characteristics to a large extent so that it was found unsuited for thermally shrinked packaging.

EXAMPLE 8

From a polyamide resin of a copolymer of nylon-6 with nylon-66, a modified polyethylene resin, an EVOH having an ethylene content of 38% by mole, a saponification degree of 98% or more, and a water content of 0.25% by weight (Product of Nippon Synthetic Chemical Industries Co., Ltd., "Soanol ET") as an oxygen barrier resin layer, and a polyethylene resin as a sealant material layer, a tubular unoriented laminate raw fabric was produced to have the layer construction in the order of the polyamide resin layer as the outermost layer, the modified polyethylene resin layer, the EVOH layer, the modified polyethylene resin layer, and the polyethylene resin layer as the innermost layer, using a five-layer circular die connected to four extruders. The tubular unoriented laminate raw film was then biaxially oriented and set in the same inflation-type manner as in Example 1 using the orienting device and the setting device as shown in the FIGURE. The raw film was biaxially oriented each by 3.0 times in the longitudinal and transverse directions.

It was thus found that the raw film was oriented well without causing any bubbles in the EVOH layer and the extrusion molding was conducted with ease with no large load imposed on the extruder for extruding the EVOH layer.

The thus oriented laminate film was then immersed in a warm water at 35° C. and the polyamide resin layer was allowed to absorb water in an amount of 8.0% by weight. During this step, amounts of shrinkage in the longitudinal and transverse directions were each about 3%. The oriented laminate film was then heated at 70° C. for approximately 8 seconds while it was dried to cause the water content of the polyamide resin layer to become 4.2% by weight. During the thermal treatment step and the drying step, the laminate film was set with a relaxation of 7% each in the longitudinal direction and in the transverse direction while thermally shrinking, whereby the natural shrinkability was caused to lose in the sealant material layer or the adhesive resin layer or the EVOH layer.

The layers of the thermally shrinkable multilayer film thus prepared were as thick as 10μ, 5μ, 8μ, 15μ, and 12μ, respectively, in the order from the outermost layer. The thermal shrinkages of the thermally shrinkable multilayer film in a hot water of 80° C. in the longitudinal direction and in the transverse direction, respectively, were 21% and 22%, and its thermal shrinkages at 90° C. were 27% and 28%, respectively. When it was allowed to stand at 23° C. and 40° C., the natural shrinkabilities in the longitudinal direction and in the transverse direction were 0.8% and 1.2% and 1.8% and 2.1%, respectively.

The thermally shrinkable multilayer film thus prepared was not caused to decrease the film flatness without causing curls even if placed under natural conditions. It was found to provide thermally shrunken packages with a favorable appearance and maintain good storage properties for a long period of time when it packed a piece of roast pork.

What is claimed is:

1. A process for preparing a thermally shrinkable multilayer film comprising the steps of:
    (a) biaxially orienting an unoriented laminate film coextruded so as to be composed of a polyamide resin layer as one surface layer and a sealant material layer as the other surface layer;
    (b) then contacting the polyamide resin layer with water to allow the polyamide resin layer to absorb water in the amount of 7.0% by weight or more while maintaining the temperature of the oriented laminate film at 90° C. or lower;
    (c) heating the oriented laminate film to temperatures ranging from 50° C. to 90° C. after or during step (b); and
    (d) drying the oriented laminate film so as to cause the water content of the polyamide resin layer to be in the range from 2.5% by weight to 6.5% by weight while maintaining the oriented laminate film at temperatures of 90° C. or lower after or during step (c), step (d) being conducted after step (c) when step (c) is conducted during step (b).

2. The process according to claim 1, wherein the unoriented laminate film is coextruded by means of a plurality of extruders and circular dies so as to be composed of the polyamide resin layer as the outermost layer and the sealant material layer as the innermost layer and cooled rapidly using the water-cooling method.

3. The process according to claim 1, wherein the unoriented laminate film is biaxially oriented simultaneously using the inflation method.

4. The process according to claim 1, wherein the oriented laminate film is continuously immersed in a warm water bath at temperatures of 90° C. or lower to allow the polyamide resin layer to absorb water.

5. The process according to claim 1, wherein, in step (c), the oriented laminate film in a tubular form is fed into two pairs of nip rollers, pressurized air is blown into the tubular laminate film and hot air is blown on the laminate film in the bubble form.

6. The process according to claim 1, wherein, in step (d), the oriented laminate film in a tubular form is fed into two pairs of nip rollers, pressurized air is blown into the tubular laminate film and hot air is blown on the laminate film in the bubble form.

7. The process according to claim 1, wherein steps (c) and (d) are carried out simultaneously.

8. The process according to claim 7, wherein the oriented laminate film is relaxed in both the longitudinal and the transverse directions during steps (c) and (d).

9. The process according to claim 1, wherein the unoriented laminate film is coextruded so as to provide a saponified ethylene-vinyl acetate copolymer layer between the polyamide resin layer and the sealant material layer.

10. The process according to claim 9, wherein the saponified ethylene-vinyl acetate copolymer layer is formed by coextrusion of a saponified ethylene-vinyl acetate copolymer raw material containing water in such an amount as to satisfy the following equation:

$$0.004(100 - x) + 0.10 \geq Mc \geq 0.022 \sqrt{(100 - x)}$$

where
Mc is a water content in % by weight, and
x is an ethylene content in % by mole ($26 \leq x \leq 55$).

* * * * *